Aug. 9, 1938.   C. E. REED   2,126,038
ROLLER CUTTER, SPINDLE, AND ANTIFRICTION BEARING ASSEMBLY
Original Filed Jan. 4, 1937
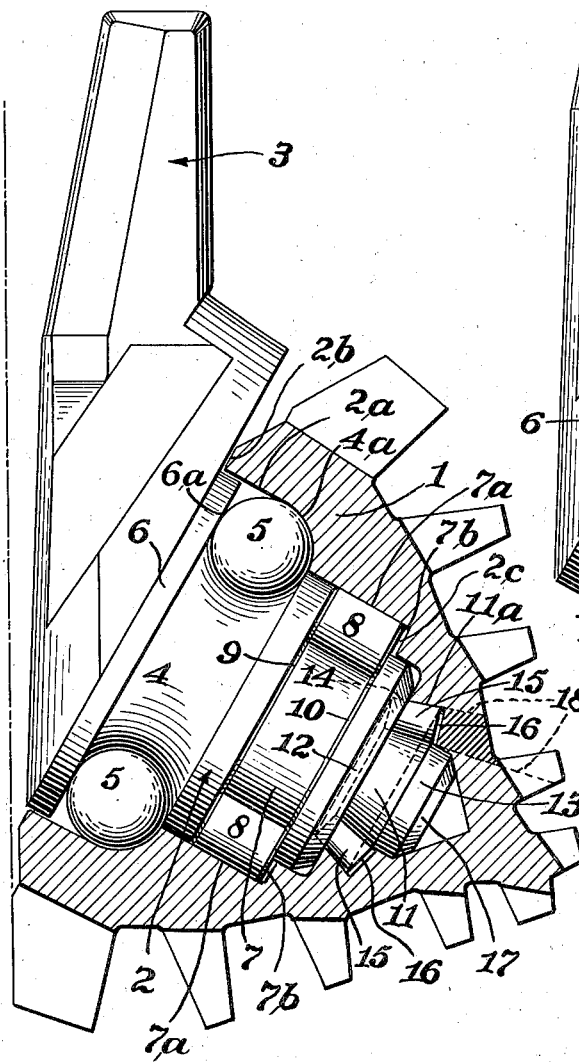
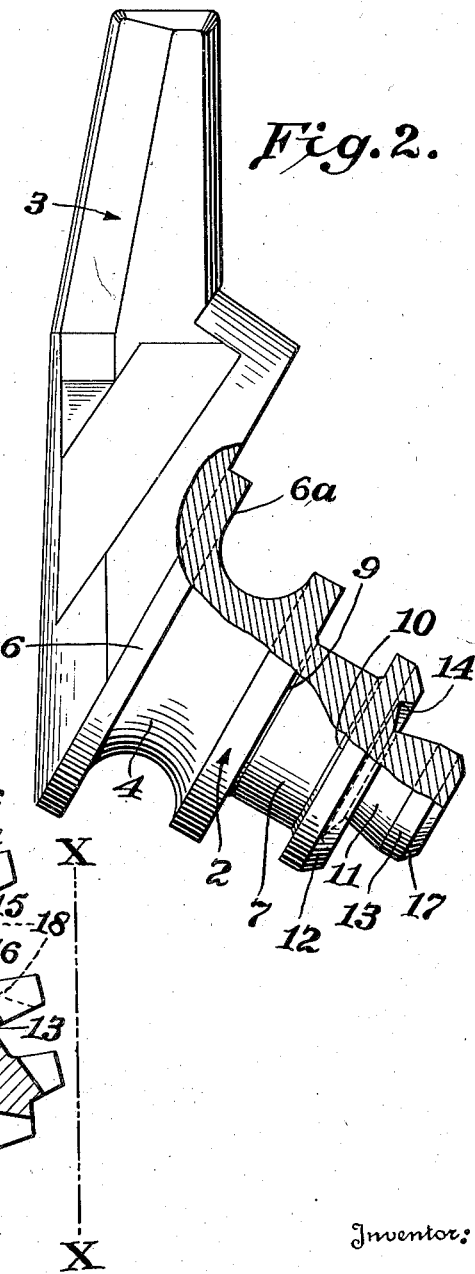
Inventor:
Clarence E. Reed,
By Spear, Donaldson & Hall
Attorneys.

Patented Aug. 9, 1938

2,126,038

UNITED STATES PATENT OFFICE 2,126,038

ROLLER CUTTER, SPINDLE, AND ANTIFRICTION BEARING ASSEMBLY

Clarence E. Reed, Wichita, Kans., assignor to Chicago Pneumatic Tool Company, New York, N. Y., a corporation of New Jersey Application January 4, 1937, Serial No. 119,016
Renewed April 4, 1938

12 Claims. (Cl. 255—71)

The invention concerns a roller cutter, spindle, and anti-friction bearing assembly for earth boring drills, said assembly having ample capacity to take radial loads imposed upon the cutter at various points along the cutting surface thereof, and having also capacity to take end thrust of the cutter both inwardly towards the vertical axis of the drill and outwardly in respect thereto.

In the accompanying drawing:

Figure 1 is a view of the assembly with the roller cutter in longitudinal section, and with the spindle, together with its support and the anti-friction bearing members in elevation.

Fig. 2 illustrates the spindle and support therefor mainly in elevation, a part of the spindle being shown in section.

In the drawing the roller cutter 1 is illustrated, for convenience, as being of the frusto-conical form having teeth projecting from its base zone and also from its apex zone, said zones being at an angle to each other. The spindle is formed in one piece throughout and also in one piece with its support, the spindle being illustrated generally at 2, and its support at 3. The latter is in the form of a shank extending upwardly at an angle from the spindle proper, at an inclination to the longitudinal axis of the spindle. The spindle chosen to illustrate my invention is of the type having a free end enclosed by the roller cutter.

A raceway is provided at 4, curved in cross section to accommodate anti-friction balls 5 of comparatively large diameter. This ball raceway is located adjacent the base of the spindle indicated at 6 intermediate the spindle proper and its support. The spindle is also provided with a raceway 7 adapted to receive cylindrical anti-friction rollers 8. The bottom of this raceway 7 is cylindrical and the sides are provided by shoulders 9, 10 lying in planes at right angles to the spindle axis, the said shoulders being adapted to be contacted by the end faces of the roller bearings 8. This cylindrical raceway of the spindle is located between the ball raceway thereof and the free end of the spindle.

At a point between the cylindrical raceway and the free end of the spindle is located a frusto-conical surface or raceway 11, tapering towards the spindle support, or in other words, in a direction away from the free end of the spindle. This frusto-conical raceway lies between the shoulder 12 and the surface 13 near the inner end of the spindle. The shoulder 12 is under cut to provide an annular groove 14 to receive the smaller diameter ends of frusto-conical anti-friction bearing rollers 15, whose tapered bearing surfaces engage the tapered raceway surface 11 above mentioned.

The raceway surface 11 is wide enough to provide a space 16 at the larger diameter end faces of the frusto-conical bearing rollers so they cannot be compressed endwise. The free end of the spindle is provided with a beveled portion providing an inclined friction surface 17 against which the wall of the bore of the roller cutter frictionally bears. The roller cutter is provided with complementary raceways to those mentioned above, the complementary raceway for the anti-friction balls being shown at 4a, the curved surface of which merges into the cylindrical bore portion at 2a which extends through to the base face 2b of the roller cutter, said bore surrounding the base flange 6 of the spindle. The complementary raceway in the cutter for the cylindrical raceway 7 of the spindle is indicated at 7a. This portion of the bore of the spindle at 7a is of smaller diameter than the raceway in the cutter for the balls 5.

Clearance is provided at 7b between the end face of the cylindrical rollers 8 and the shoulder or wall 2c of the cutter so that the cylindrical roller bearings will be free on their inner end faces from the end thrust of the roller cutter in a direction outwardly towards the spindle support. The complementary frusto-conical raceway surface in the bore of the roller cutter for the frusto-conical roller bearings 15 is shown at 11a, this surface consequently tapering towards the spindle support.

From the above described construction it will be noticed that the comparatively large balls 5 sustain radial loads imposed thereon from the cutter. Also they sustain end thrust of the roller cutter outwardly towards the spindle support and in a direction outwardly from the vertical axis of the drill indicated by the line $x$—$x$, and this thrust of the cutter to which the balls are subjected is sustained by the face 6a of the base flange 6 of the spindle, which face lies in the plane at right angles to the longitudinal axis of the spindle.

The roller bearings 8 sustain radial loads and are free from end thrust on their inner end faces by reason of the clearance at 2c and they are also free from end thrust of the roller cutter imposed on their peripheries by the cutter in a direction outwardly from the vertical axis of the drill by reason of the fact that the balls 5 sustain this outward end thrust of the cutter.

Further, these cylindrical roller bearings 8 are freed from end thrust imposed upon their peripheries by tendency of the roller cutter to move inwardly towards the vertical axis of the drill by the frusto-conical rollers 15 which have their larger diameter portions disposed inwardly towards the vertical axis of the drill. In other words, the end thrust of the roller cutter inwardly towards the vertical axis of the drill is sustained by reason of the fact that the frusto-conical anti-friction rollers are arranged with their smaller diameter ends directed outwardly, and that they bear upon the frusto-conical raceway surface 11 which flares inwardly towards the vertical axis of the drill.

By reason of the above described arrangement, the comparatively large diameter cylindrical anti-friction bearing rollers 8 are free to rotate on their raceways without being unduly forced axially either outwardly or inwardly in an axial direction, the balls 5, together with the clearance 2c preventing outward end thrust of the roller cutter from forcing the cylindrical bearing rollers in a direction outwardly from the vertical axis of the drill, and the frusto-conical raceway 11, together with the frusto-conical rollers 15 taking end thrust of the roller cutter in a direction towards the vertical axis of the drill.

Furthermore, it will be noticed that the frusto-conical bearing rollers lock the roller cutter rotatively on the spindle, because, as above stated, the larger diameter ends of the frusto-conical rollers are directed inwardly towards the vertical axis of the drill.

For assembling the frusto-conical rollers a gateway is provided through the roller cutter indicated by the dotted lines 18, this gateway having its bore tapering outwardly, said bore being substantially coincident with the peripheral surface of the frusto-conical rollers. After the frusto-conical rollers are locked in their raceway the gateway 18 may be closed by a suitable plug.

By reason of relieving the cylindrical bearing rollers of end thrust of the cutter both inwardly and outwardly in relation to the vertical axis of the drill the said cylindrical roller bearings will not be thrust with their end faces against the side walls 9, 10 of the raceway 7 and hence the cylindrical rollers will not drag at either their inner or outer ends and will not grind the raceway surface by reason of a skewed position relative to the spindle.

I claim:

1. A roller cutter and roller bearing assembly for an earth boring drill comprising a roller cutter, a spindle, a support for the spindle, ball bearings between the cutter and the spindle, cylindrical roller bearings between the cutter and the spindle, and tapered roller bearings also between the cutter and the spindle.

2. A roller cutter and roller bearing assembly according to claim 1 in which the tapered roller bearings have their larger ends towards the axis of the drill.

3. A spindle for an earth boring drill comprising a body portion having thereon a ball raceway, a cylindrical roller bearing raceway and a tapered roller bearing raceway.

4. A roller cutter for an earth boring drill having a toothed exterior and a bore having a ball bearing raceway surface, a cylindrical roller bearing raceway surface and a tapered roller bearing raceway surface.

5. A roller cutter for an earth boring drill according to claim 4, one of the raceway surfaces being the portion of a groove in the bore of the cutter.

6. A roller cutter and roller bearing assembly for an earth boring drill, according to claim 1, in which the ball bearings are located at the bases of the spindle and roller cutter and take radial loads, and also end thrust of the cutter outwardly, and imposes it upon the spindle support, the cylindrical roller bearings being arranged with their axes parallel with the spindle axis and taking radial loads of the cutter at a zone intermediate the balls and the free end of the spindle, at which latter the frusto-conical roller bearings are located with their larger ends towards the vertical axis of the drill and take end thrust of the cutter inwardly towards the vertical axis of the drill, said balls and frusto-conical rollers relieving the cylindrical rollers from end thrust of the roller cutter imposed upon their cylindrical surfaces in directions both outwardly and inwardly in respect to the vertical axis of the drill.

7. A roller cutter and roller bearing assembly for an earth boring drill comprising a support adapted for attachment to a bit head, a spindle projecting from said support and having a free end, an approximately frusto-conical cutter enclosing said spindle, said cutter and spindle having complementary ball bearing raceways, a set of ball bearings between said raceways, said spindle and cutter having complementary tapered raceways and frusto-conical roller bearings in said tapered raceways.

8. An earth boring drill comprising a spindle, a roller cutter surrounding said spindle, a set of ball bearings between said cutter and spindle, and a set of tapered roller bearings between said cutter and spindle.

9. An earth boring drill comprising a spindle connected at one end to a support, the other end of the spindle being free, ball bearings between the cutter and spindle, and tapered roller bearings between the cutter and spindle, said tapered roller bearings having their larger ends toward the free end of the spindle.

10. An earth boring drill comprising a spindle connected at one end to a support, the other end of the spindle being free, ball bearings between the cutter and support, and tapered roller bearings between the cutter and support, said tapered roller bearings having their larger ends toward the free end of the spindle, said ball bearings being positioned between the tapered bearings and the support.

11. An earth boring drill comprising a spindle, a cutter surrounding said spindle, a set of ball bearings between said cutter and spindle, a set of tapered roller bearings between said cutter and spindle and a set of cylindrical roller bearings between the cutter and spindle and positioned intermediate the ball bearings and the tapered bearings.

12. An earth boring drill comprising a spindle connected at one end to a support, the other end of the spindle being free, ball bearings between the cutter and support, cylindrical roller bearings between the cutter and support, and tapered roller bearings between the cutter and support, the ball bearings being adjacent the support, the tapered bearings being adjacent the free end of the spindle, and the cylindrical bearings being positioned between the ball bearings and the tapered bearings.

CLARENCE E. REED.